June 23, 1970  D. H. DANE  3,516,711
HARNESS ASSEMBLY
Filed April 23, 1968  6 Sheets-Sheet 5

INVENTOR
DAN H. DANE
BY
ATTORNEYS

United States Patent Office 3,516,711
Patented June 23, 1970

3,516,711
HARNESS ASSEMBLY
Dan H. Dane, Huntsville, Ala., assignor to the United States of America as represented by the Administrator of the National Aeronautics and Space Administration
Filed Apr. 23, 1968, Ser. No. 723,476
Int. Cl. A62b 35/00; C09b
U.S. Cl. 297—385                                    11 Claims

ABSTRACT OF THE DISCLOSURE

A harness assembly adapted to support a human test subject on a ground based apparatus which simulates low or no gravity conditions. The harness assembly has a backrest which is adjustably connected to the support bar of the simulator so as to position the center of gravity of the human within the harness at the desired location. On each side of the backrest and pivotally connected thereto at a location approximating the hip joint of the human test subject is an articulated side member. The upper segment of the side member is connected to the lower segment so as to counterbalance the weight of the lower segment together with the weight of the human's test subject's legs strapped thereto. Thus, the harness assembly allows the human test subject to pivot his legs and at the same time simulates the effects of weightlessness upon the legs.

---

The invention described herein was made by an employee of the United States Government and may be manufactured and used by or for the Government for governmental purposes without the payment of any royalties thereon or therefor.

BACKGROUND OF THE INVENTION

Field of the invention

The invention relates to a harness assembly for apparatus used for simulation of low or no gravity conditions, which harness assembly is adapted to support a human test subject.

Description of the prior art

Those ground type simulators which enable a human test subject such as an astronaut to become familiar with his tools and equipment while in a substantially weightless condition utilize a harness assembly to support the human test subject. Herebefore, however, the harness assemblies of prior simulators held the test subject in a substantially rigid state by a framework which permitted only the arms to be free. Obviously, since the human test subject could not move his legs nor use his feet the prior harness assemblies were of limited usefulness. While it was recognized that it would be useful to have the legs freely move, the shifting of the legs would rapidly change the center of gravity of the human test subject in the harness assembly and cause him to pitch, sometimes violently, in a new direction. Also, a harness assembly which was merely hinged so as to enable the human test subject to move his legs would require substantial leg muscle control which would quickly fatigue the human test subject.

Accordingly, it is an object of the present invention to provide a human harness assembly which permits easy leg movements.

Another object is to provide a harness assembly for supporting a human test subject in a zero-gravity simulator in a manner that his legs will experience the effects of zero-gravity.

Other and further objects, uses, and advantages of the present invention will become apparent as the description proceeds.

BRIEF DESCRIPTION OF THE INVENTION

The harness assembly of the present invention is adapted for use on an apparatus for simulating low or no gravity conditions. It provides a middle frame adapted to support the back and head of a human test subject such as an astronaut. On each side of the frame and pivotally connected thereto at a location approximating the hip joint of the test subject is a main side member. Each main side member is pivotally connected substantially midway between its ends to the side of the frame and is adapted to have its lower half strapped to a thigh of the test subject. Pivotally joined to the lower end of each main side member is a lower side member which is adapted to be strapped to a lower leg of the test subject. The joint between the main side member and lower side member is at a location approximating the knee joint of the test subject.

Each of the main side members has pivotally secured to its upper end, an upper side member. Connecting rods extend between each upper side member and lower side member located on the same side of the backrest frame whereby a pivoting movement of the lower side member by a leg of the test subject will cause a pivoting movement of the upper side member on that same side in the opposite direction. Weights are attached to the upper end of each main side member as well as the upper end of each upper side member to effectively counterbalance the weight of the legs of the test subject and the other portions of the harness assembly strapped thereto.

This will be more readily understood by the following detailed description when taken together with the accompanying drawings.

DETAILED DESCRIPTION OF THE PRESENTLY PREFERRED EMBODIMENT

Figure 1:
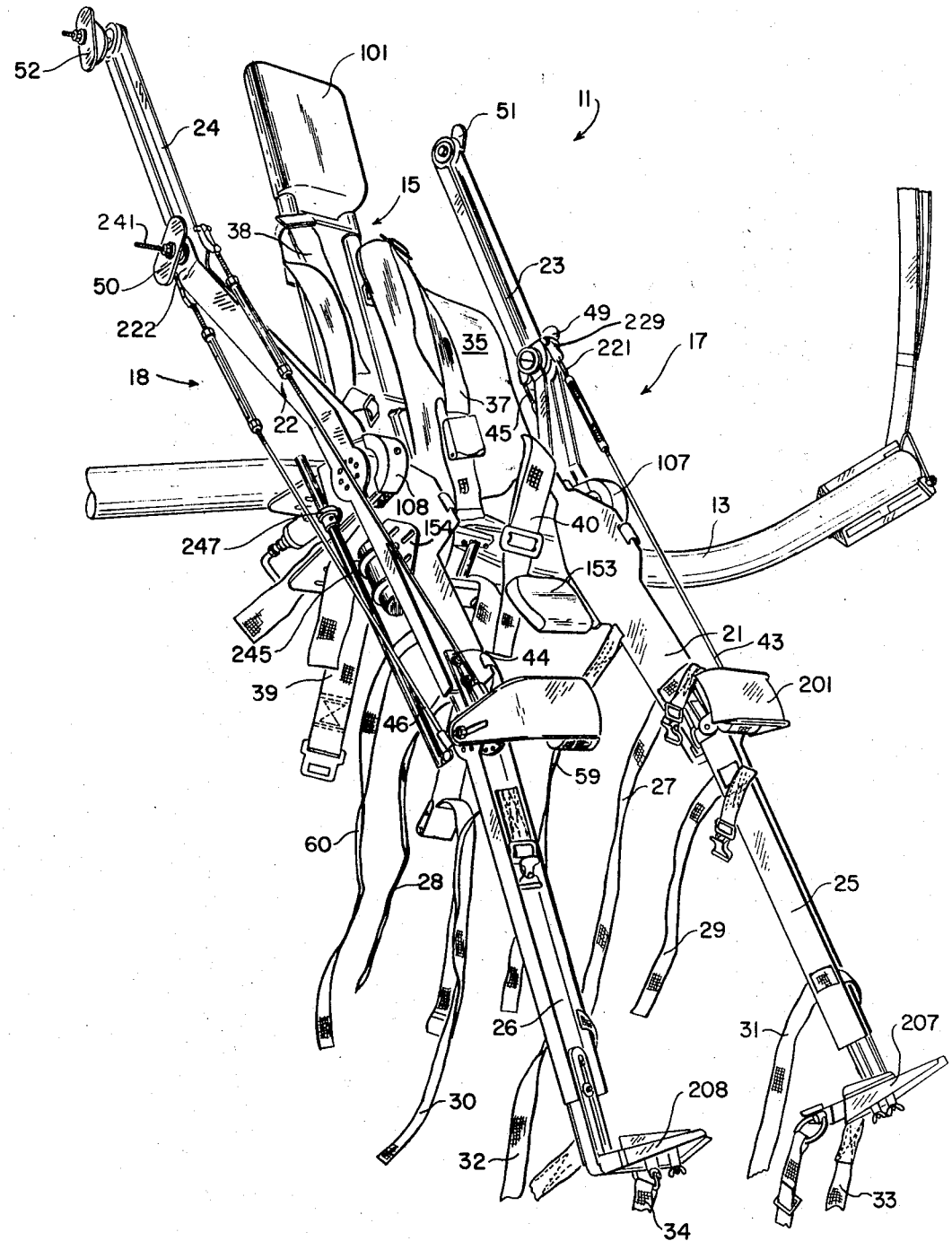
FIG. 1 is a perspective view of the harness assembly according to the present invention.

Referring now to FIG. 1 wherein is illustrated a harness assembly 11 according to the present invention mounted upon the main support bar 13 of an apparatus adated to simulate low or no gravity conditions. Further description of the main support bar 13 and the other portions of the apparatus which give the harness assembly 11 a full six-degree freedom of motion is described in detail in copending application for "Mechanical Simulator," Ser. No. 700,984, invented by Dan H. Dane, filed Jan. 26, 1968, and assigned to the U.S. Government.

The harness assembly 11 is composed essentially of a frame 15 for supporting the back and head of a human test subject (not shown), and two articulated side members 17 and 18 pivotally attached to opposed sides of the frame 15 at a location corresponding to the hip joints of the test subject. Each side member 17, 18, has a main member 21, 22, an upper member 23, 24 and a lower member 25, 26 pivotally connected together. The lower half of the main side members 21, 22 and the lower side members 25, 26 are adapted to be secured to the legs of the test subject with straps 27 to 34, 59, and 60. The body of the test subject is secured to the backrest 35 of the frame 15 with straps 37 to 40 adapted to cross the chest and waist of the test subject.

The upper side members 23, 24 and lower side members 25, 26 on the same side of the frame are connected together with front rods 43, 44 and rear rods 45, 46 so that when the test subject pivots the lower side members 25, 26 strapped to his legs, the upper side members 23, 24 will pivot in the opposite direction. Weights 49 to 52, are attached to the uppermost ends of the main side members 21, 22 and the upper side members 23, 24 to counterbalance the weight of the lower portions of the articulated side members 17, 18 together with the weight of the legs of the test subject so as to simulate the effects of weightlessness upon the legs.

Figure 2:
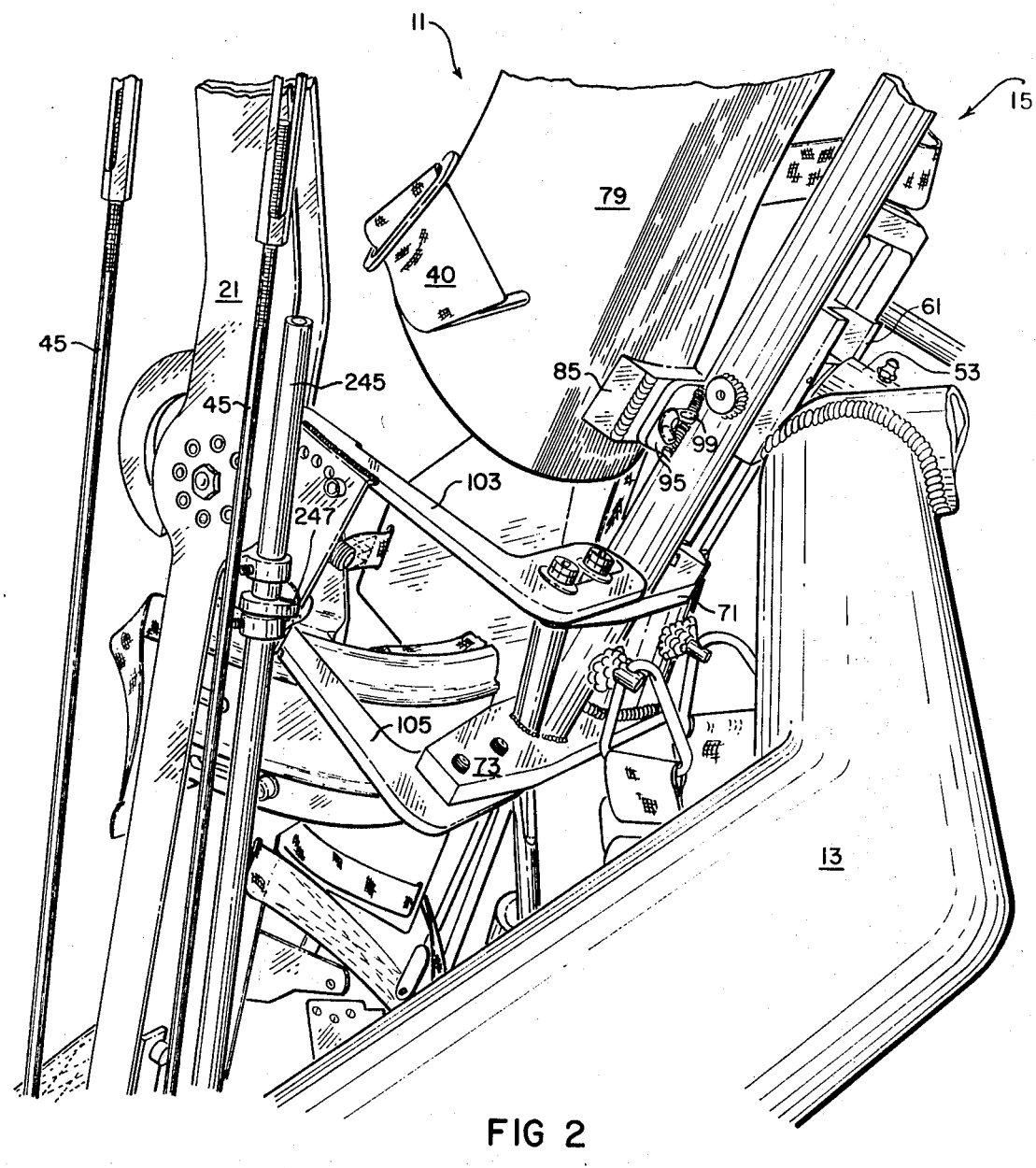
FIG. 2 is a partial enlarged perspective view of the back of the harness assembly.

The harness assembly 11, as shown best in FIG. 2, is secured to a mounting plate 61 on the end of a tubular shaft 53 which is rotatively secured to the center of the main support bar 13 of the apparatus for simulation of low or zero gravity conditions. The harness frame 15 is secured to the plate 61 through a screw 63, shown in FIGS. 3 and 4, so its position may be adjusted to locate its center of gravity at a desired location. The screw 63 extends through a bore in a cross bar 65 which is welded to two parallel bars 69, 70 of the frame 15 and through a threaded bore in the plate 61. The end of the screw 63 is journaled into a first flat bar 71 (see FIG. 3) adjacent the lower end of the frame. A pair of plates 76 and 77 (see FIG. 4) are secured to adjacent sides of the two parallel bars 69, 70 to form a good sliding contact with the plate 61 and thereby permit easy adjustment of the screw 63. Thus, it can be seen, that by turning the head of the screw 63, the harness assembly 15 may be made to slide to and fro with respect to the mounting plate 61 and shift the position of its center of gravity. Both the first and second flat bars 71, 73 extend outwardly from the two parallel bars 69, 70 to form a support for the articulated side members 17 and 18 as will be discussed hereinafter.

Figure 3:
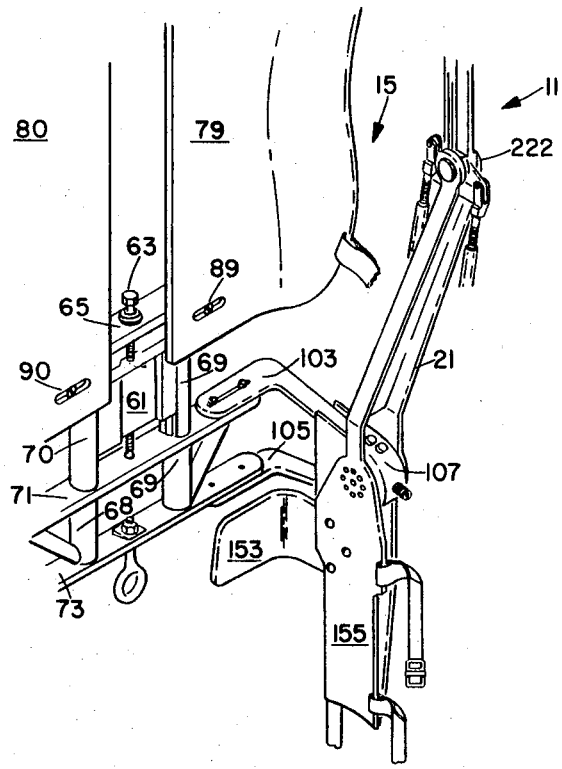
FIG. 3 is a partial enlarged perspective view of the left side of the harness assembly.
Figure 4:
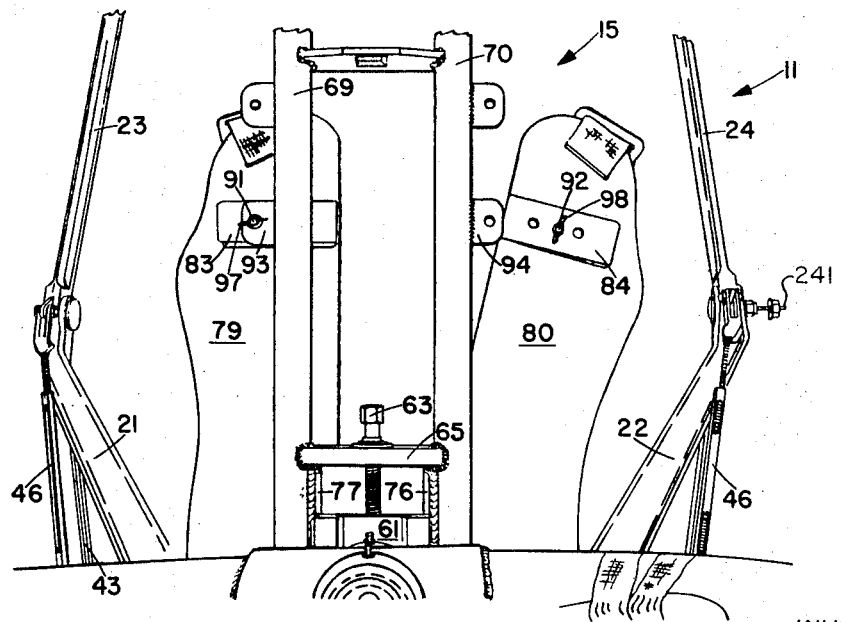
FIG. 4 is a partial back view of the harness assembly.

As shown in FIGS. 2, 3, and 4, backrest 35, discussed in reference to FIG. 1, is composed of two members 79, 80 which are curved to fit the human test subject. Each backrest member has two upper plates 83, 84 (FIG. 4) and two lower plates 85 (see FIG. 2; while the plate on the right side is not shown, it is similar to plate 85 on the left side), secured to its back, and each plate 83, 84, 85 has a plurality of bores aligned longitudinally therein. Each plate 83, 84, 85 has an upper surface contoured to fit the curved surface of the backrest members 79, 80. The backrests 79, 80 have a slot adjacent each plate 83, 84, 85 which reveals the bores in the plate from the front of the backrest whereby a bolt 89 to 92 may be positioned through anyone of the bores in each plate to adjustably position the backrests 79, 80.

Short flanges 93 to 95 (FIGS. 2 and 4) are secured to the upper and lower portions of the two parallel bars 69 and 70 to serve as an anchorage for the bolts 89 to 92. The short flange on the lower right side is not illustrated but is similar to flange 95 shown in FIG. 2. A wing nut 97 to 99 is manually screwed down on each bolt shaft to securely hold the backrest members 79, 80 to the short flanges 93 to 95. In FIG. 4 the backrest 80 is shown pivoted on its lower bolt to reveal its entire upper plate 84. The bolts 89 to 92 are positioned into different bores of the plates 83, 84, 85 to adjust the distance between the curved surface of the backrests 79, 80 according to the physical characteristics of the human test subject.

A head rest 101, as shown in FIG. 1, extends between the uppermost ends of the two parallel bars 69, 70 and may be padded to prevent injury to the head of the test subject.

As indicated in FIGS. 2 and 3, each end of the first and second flat bars 71, 73 is secured to an adjacent end of a pair of L-shaped members 103, 105. While only the pair of L-shaped members on the left side are illustrated in detail, the L-shaped members on the right side are identical as implied by FIG. 1. The base of each L-shaped member 103, 105 is slotted and bolts extend through the slots into threaded bores within the first and second flat bars 71, 73.

Figure 6:
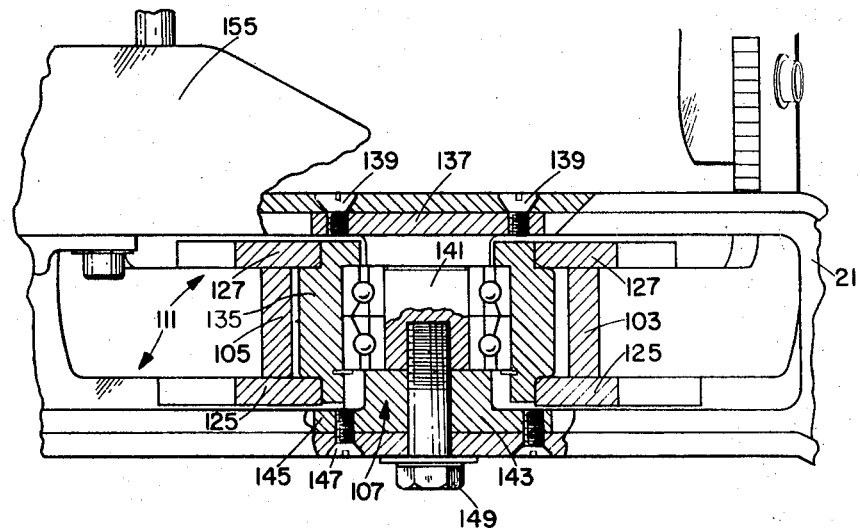
FIG. 6 is a cross-sectional view taken through the bearing assembly of FIG. 5.

Each pair of L-shaped members 103, 105 support a bearing assembly 107 or 108 (see FIG. 1) for a main side member 21, 22. The main side members 21, 22 are in the shape of a variable width I-beam having an upper portion sloping outwardly from the backrest 15. As indicated by FIG. 6, a portion of the web 111 between the flanges of each side member 21, 23 is removed so the L-shaped members 103, 105 may extend therethrough.

The bearing assemblies 107, 108 will be explained in regard to the detailed view of the left bearing assembly 107 shown in FIGS. 5 and 6. The front ends of the L-shaped members 103, 105 have a semicircle end 121 extending between and secured thereto. A lower plate 123 extends between and is welded to the two adjacent L-shaped members 103, 105. On each side of the L-shaped members 103, 105 is secured a sheet 125, 127 having an oblong slot therein. A front screw 129 extends through a threaded bore within the center of the semicircle end 121 and a rear screw 131 extends through a threaded bore within the center of the lower plate 123. A bearing 133 fits within the oblong slots and has an enlarged center portion 135 (see FIG. 6) so as to be keyed in between the two L-shaped members 103, 105.

The bearing has a first circular plate 137 secured by screws 139 onto the inner flange of the main side member 21. The plate 137 has a cylindrical shaft 141 which is joined to a smaller cylindrical shaft 143 of a second circular plate 145 secured by screws 147 to the outer flange of the main side member 21. A bolt 149 holds the two shafts 141, 143 together. Thus, it should be apparent that the outer race of the bearing 133 is supported by the L-shaped supports 103, 105 and the inner race of the bearing 133 is supported by the main side member 21. Identically, although not shown, the right side member 22 is also supported by the bearing assembly 108 so it may easily pivot relative to the backrest 15.

The front and rear screws 129, 131 may be used to position the main side member 21 relative to the backrest 15 according to the hip joint characteristics of the human test subject.

Figure 5:
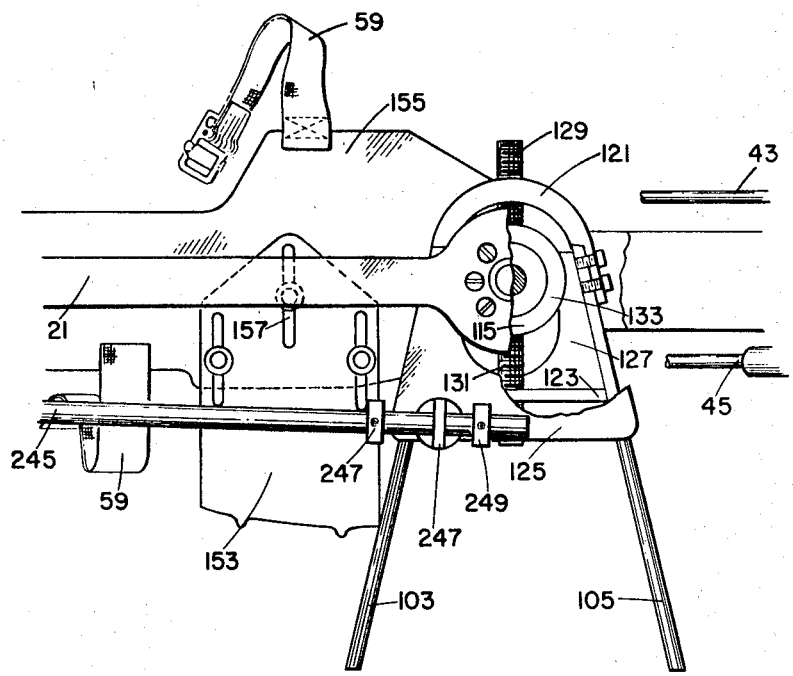
FIG. 5 is a side view of a main bearing assembly, parts removed for clarity, of the main support member.

As shown by FIGS. 1, 3, and 5, an L-shaped seat 153 for the human test subject extends through an opening in the web of the left main support member 21 and is bolted onto the outer surface of the inner flange 155. Although not specifically shown, a similar seat is bolted onto the inner flange of the right support main support member 22 as indicated by 154 in FIG. 1. The slots 157 (see FIG. 5) in the supporting flange of the seat member 153 allow for a certain amount of adjustment. The inner flanges of the lower portions of the main support members 21, 22 are enlarged and concaved so as to fit snugly against the hips of the test subject.

Pivotally attached to the lower end of each main side member 21, 22 is a lower side member 25, 26 which is adapted to be strapped to a lower leg of the human test subject. The lower side members 25, 26 are in the shape of a variable width I-beam having its flange on the sides. The knee bearing assembly for joining each lower side member 25, 26 to the adjacent main side member 21, 22 is illustrated best in FIGS. 7 and 8. The knee bearing assembly has a connecting bar 163 formed with a circular bight portion 165 (shown in broken lines in FIG. 7) at its lower end and a front flat portion 167 and a rear flat portion 169 at its upper end. The flat portions 167, 169 are secured to opposed sides of the web 171 of the main side supports 21, 22, which as previously noted have an I-beam shape, by bolts 173, 175.

Figure 7:
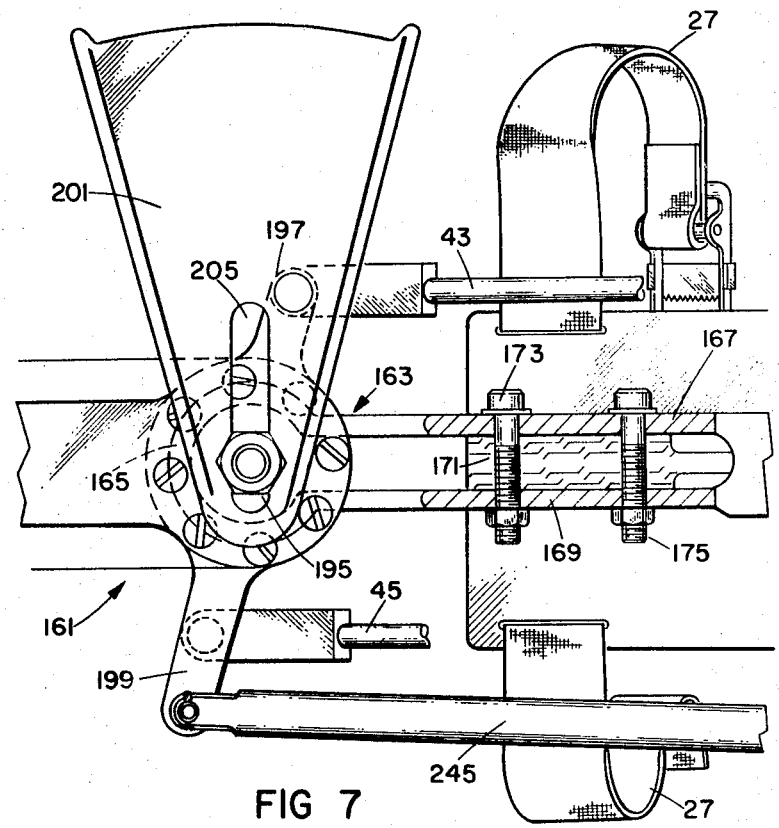
FIG. 7 is an enlarged side view of the pivoting joint between a main side member and a lower side member.
Figure 8:
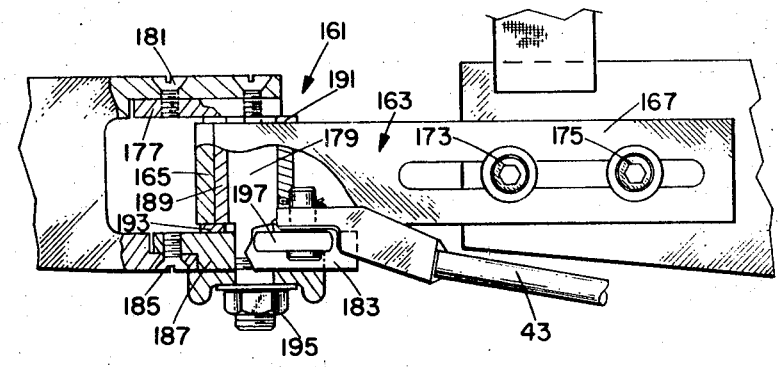
FIG. 8 is a cross-sectional view taken through the pivoting joint of FIG. 7.

The upper ends of the lower side supports 25, 26 have a portion of their web removed as indicated in FIG. 8. A plate 177 with an integral cylindrical shaft 179 extending perpendicular thereto is secured to the inner flange of the lower side member by screws 181. An outer plate 183, having a center bore is secured to the outer flange of the lower side member by screws 185. The upper end of the outer flange, as shown best in FIG. 7, is circular and has a center bore. The outer plate 183 has a circular raised boss 187 which extends through the center bore in the outer flange. Also the outer plate 183 has a center bore through which the outermost end of the cylindrical shaft 179 extends. The outermost end of the cylindrical shaft 179 is threaded.

Further, the cylindrical shaft 179 extends through the center of the circular bight portion 165 of the connecting bar 163 and a tubular bronze sleeve bearing 189 separates the inner surface of the bight portion 165 from the outer surface of the cylindrical shaft 179. Bronze washer bearings 191, 193 encircle the cylindrical shaft 179 and extends between the bight portion 165 and the inner surface of the plates 177, 183. Thus, it can be seen that the lower side members 25, 26 will pivot on a cylindrical shaft of its corresponding knee bearing assembly. A nut 195 is screwed onto the threaded end of the cylindrical shaft 179.

Figure 9:
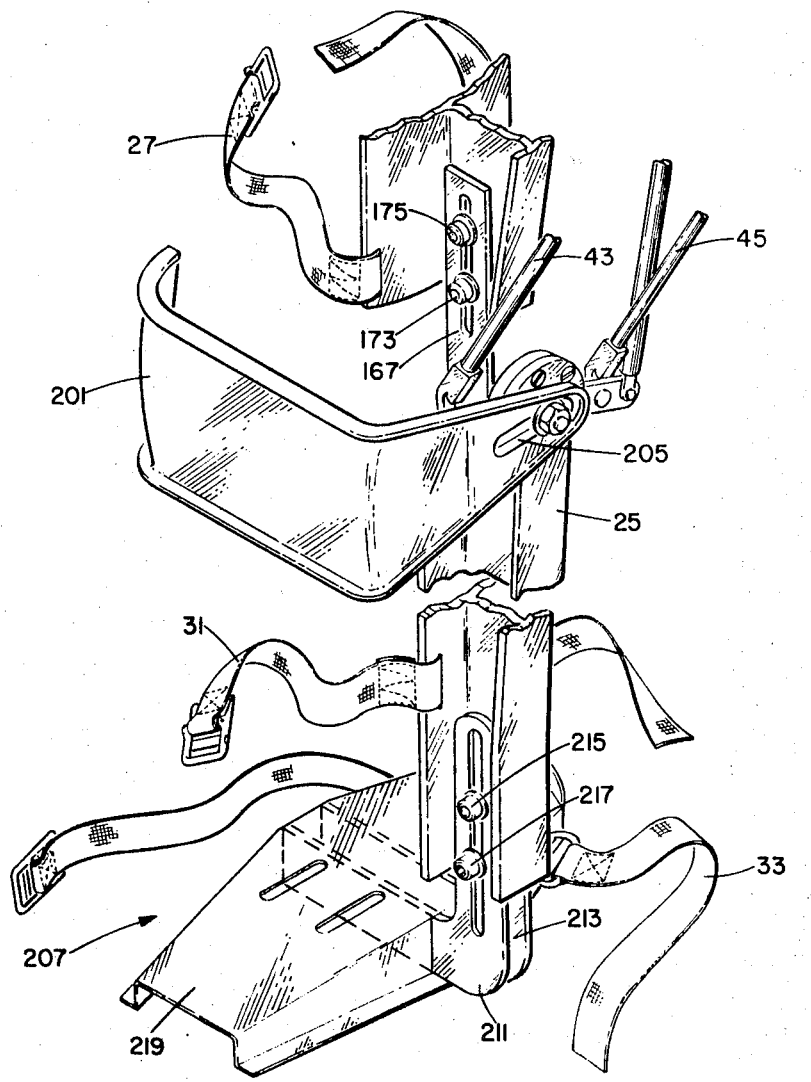
FIG. 9 is a partial perspective view showing the foot rest attached to the lower end of the lower side member.

The outer plate 187 of the knee bearing assembly 161 has adjacent its inner surface an integral front lug 197 and a rear lug 199 to which the front rod 43 or 44 and rear rods 45 or 46 are pivotally joined. The slots provided in the front and rear flat portions 167, 169 of the connecting bar 163 (see FIG. 8) allow the lower side members 25, 26 to be adjusted to position the bearing assembly 161 adjacent the knee of the test subject. A L-shaped knee restraint 201, see FIGS. 1, 7 and 9, is secured to the bearing assembly by the nut 195 threaded on the cylindrical shaft 179. The knee restraint 201 has an elongated slot 205 so its position may be adjusted to fit the human test subject.

As illustrated in FIG. 1, the lower end of each lower side member 25, 26 has a foot rest 207, 208 extending inwardly. With reference to the detailed illustration of the foot rest 207 shown in FIG. 9, it is seen that each foot rest has two parallel L-shaped plates 211, 213, secured by their upper portions to opposed sides of the web of a lower side member. The upper portions are slotted and have bolts 215, 217 extending through the slots and the web of the lower side member so as to be adjustable. An angled plate 219 is welded to the lower portions of the L-shaped plates 211, 213 to provide sufficient area to support the entire foot of the test subject.

Referring now to FIG. 1 wherein is shown the upper side members 23, 24 which are pivotally attached to the upper end of the main side members 21, 22. Each main side member 21, 22 has an uppermost end portion 221, 222 extending substantially parallel to the backrest 15 and at an angle to its upper sloping portion. The uppermost end portion 221, 222 has its web portion removed whereby the lower end portion 223 (see FIG. 10) of the adjacent upper side member 23, 24 may extend between the inner and outer flanges 225, 227 of each main side member 21, 22.

Each upper side member 23, 24 has a shape of an elongated plate with a center reinforcing rib on each side. The lower extremity of each upper side members 23, 24 is enlarged to the full depth of the reinforcing rib and has a front lug 229 and a rear lug 231 extending therefrom.

A shaft 235 with a retaining head extends through the inner and outer flanges 225, 227 of a main side member and through the enlarged end 223 of the adjacent upper side member. A conventional bearing 237 extends between the shaft 235 and a bore in the enlarged end 223 to permit the upper side member to pivot easily relative to the main side member. The outer end of the shaft 235 is threaded and has a nut 239 screwed thereon. The shaft 235 has an elongated reduced size portion 241 which is also threaded. Weights 49, 50 (see FIG. 1) are slipped onto the reduced size shaft 241 to counterbalance the lower portion of the main side member which is adapted to be strapped to the thigh of the human test subject. The weights 49, 50 are secured in their position by a nut (shown in FIG. 1) screwed onto the threaded shaft portion 241.

Figure 10:
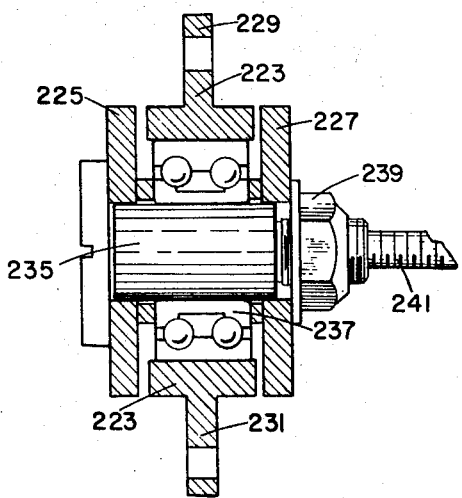
FIG. 10 is a cross-sectional view taken through a pivoting joint between a main side member and an upper side member.

The front lugs 229 and rear lugs 231 of each upper side member 23, 24, discussed in reference to FIG. 10, are connected (see FIG. 1) by front rods 43, 44 and rear rods 45, 46 to the corresponding lugs 197, 199 shown in detail in FIG. 7. As previously indicated, the connecting rods 43–46 pivot the upper side members 23, 24 in the opposite direction the human test subject pivots the lower side members 25, 26 and thereby prevents any significant shift of the center of gravity of the harness assembly 17 as well as counterbalancing the weight of the lower legs so as to give the human test subject a good simulation of weightlessness.

If it is desired to limit the pivoting movement of the lower side members, a slide bar 245, shown in FIG. 1, may be used for each articulated side member 17 and 18. The lower end of the slide bar 245 is pivotally connected to a lug 199 (see FIG. 7) of a knee bearing. The upper end of the slide bar 245 extends through a bore in a hanger 247 (see FIG. 5) secured to the outer sheet 125 attached to the bearing assemblies 107, 108. The bar 245 is adapted to slide to and fro through the hanger 247 as determined by the pivoting movements of the lower side member. A lower stop 247 and an upper stop 249 adjustably secured to the slide bar 245 on each side of the hanger 247 will limit the pivoting movement in both directions.

It is believed evident that an improved harness assembly has been disclosed for the most advanced simultators of low gravity conditions. The human test subject is allowed to bend his legs and walk, if desired, on simulated surfaces such as the moon, under actual gravity conditions of that surface. His legs when suspended in the air are effectively counterbalanced so to help in the simulation of low gravity conditions.

Obviously, many modifications and variations of the present invention are possible in light of the above teachings. It is, therefore, to be understood that within the scope of the appended claims, the invention may be practiced other than as specifically described.

What is claimed is:

1. A harness assembly for supporting a human test subject on an apparatus adapted to simulate low or no gravity conditions, comprising:

a frame adapted to support the back of the test subject;

a first elongated main support member on one side of said frame and a second elongated main support member on the other side of said frame, each main support member pivotally joined substantially midway between its ends to said frame at a location corresponding to the hip joint of a test subject;

a first lower side member below said first main side member, with the upper end of said first lower side member pivotally joined to the lower end of said first main support member;

a second lower side member below said second side member, with the upper end of said second lower side member pivotally joined to the lower end of said second main support member;

a first elongated upper side member above said first main support member with the lower end of said first upper side member being pivotally attached to the upper end of said first main support member;

a second elongated upper side member above said second main support member with the lower end of said second upper side member being pivotally attached to the lower end of said second main support member;

a first connecting rod means extending between said first upper side member and first lower side member and a second connecting rod means extending between said second upper side member and said second lower side member whereby a pivoting movement of said lower side members will cause a pivoting movement of said upper side members in the opposite direction.

2. A harness assembly as defined by claim 1 including:
a pair of seat supports;
means securing one seat support to said first main support member and means securing the other of said seat supports to said second main support member;
a pair of knee restraints;
means securing one of said knee restraints adjacent said pivoted joint between said first main support member and said first lower support member and means for securing the other of said knee restraint adjacent the pivoted joint between said second main support member and said second lower support member;
a pair of foot rests;
means for securing one of said foot rests to the lower end of said first lower side member and means for securing the other of said foot rests to the lower end of said second lower side member; and
flexible straps to bind the test subject to the frame, main side members, and lower side members.

3. A harness assembly as defined by claim 2 including:
weights attached to the upper ends of said first and second upper side members; and
weights attached to the upper ends of said first and second main support members.

4. A harness assembly as defined by claim 1, including:
means for adjustably positioning said first and second main support members relatively to said frame; and
means for adjustably positioning said first and second main support members relative to their adjacent first and second lower side members.

5. In combination with an apparatus for simulation of low or no gravity conditions, said apparatus having a main support bar, an improved harness assembly for supporting a human, comprising:
a middle frame pivotally connected to said support bar, said frame adapted to support the back and head of a human;
a pair of elongated articulated side members extending on the left and right sides of said frame;
a pair of bearing means for pivoting each of said articulated side members substantially midway between their ends to the left and right sides of said frame at a location approximating the hip joints of said human;
means for securing the portions of said articulated side members below said bearing means to the legs of said human; and
each said articulated side member having means for effectively counterbalancing the weight of said lower portion of said articulated side members secured to the legs of said human.

6. The combinations as defined by claim 5, wherein each said articulated side member further comprises:
a main side member which is pivotally supported substantially midway of its ends by said bearing means to said frame;
a lower side member pivotally secured at its upper end to the lower end of said main side member at a location approximating the knee joint of said human; and
an upper side member pivotally connected at its lower end to the upper end of said main side member.

7. The combination as defined by claim 6 wherein said means for counter-balancing the lower portion of said articulated side members comprises:
rod means extending between the lower end of said upper side members and the upper end of said lower side members whereby a pivoting movement in one direction of said lower side members relative to said main side members will cause said upper side members to pivot in the opposite direction;
weight means secured to the upper end of said upper side members; and
weight means secured to the upper end of said main side members.

8. The combination as defined by claim 6 including:
a pair of seat members for said human, one of said seat members being secured to one of said main side members and the other of said seat members being secured to the other of said main side members;
a pair of foot rests for said human, one of said foot rests being secured to the lower end of one said lower side members, and the other of said foot rests being secured to the lower end of the other of said lower side members.

9. The combination as defined by claim 5 wherein said middle frame is adjustably supported on said support bar for the shifting of the center of gravity of the harness assembly.

10. The combination as defined by claim 5 including:
seat means for supporting said human; and
knee restraint means adapted to extend over each knee of said human.

11. A combination as defined by claim 10 including:
a foot rest means for said human.

References Cited

UNITED STATES PATENTS

| | | | |
|---|---|---|---|
| 3,125,766 | 3/1964 | Halpern | 5—82 |
| 3,161,968 | 12/1964 | De Boy et al. | |
| 3,191,994 | 6/1965 | Boyce | 297—411 |

CASMIR A. NUNBERG, Primary Examiner

U.S. Cl. X.R.

35—12